US012583712B2

(12) United States Patent
Kattainen et al.

(10) Patent No.: US 12,583,712 B2
(45) Date of Patent: Mar. 24, 2026

(54) ELEVATOR COMMUNICATION SYSTEM

(71) Applicant: Kone Corporation, Helsinki (FI)

(72) Inventors: Ari Kattainen, Helsinki (FI); Juha-Matti Aitamurto, Helsinki (FI); Gergely Huszak, Helsinki (FI); Ferenc Staengler, Helsinki (FI)

(73) Assignee: Kone Corporation, Helsinki (FI)

( * ) Notice: Subject to any disclaimer, the term of this patent is extended or adjusted under 35 U.S.C. 154(b) by 1385 days.

(21) Appl. No.: 17/226,772

(22) Filed: Apr. 9, 2021

(65) Prior Publication Data

US 2021/0339976 A1 Nov. 4, 2021

(30) Foreign Application Priority Data

Apr. 30, 2020 (EP) .................................... 20172441

(51) Int. Cl.
*B66B 1/34* (2006.01)
*B66B 5/00* (2006.01)

(52) U.S. Cl.
CPC .......... *B66B 1/3453* (2013.01); *B66B 1/3423* (2013.01); *B66B 1/3461* (2013.01); *B66B 5/0031* (2013.01)

(58) Field of Classification Search
CPC ... B66B 1/3453; B66B 1/3423; B66B 1/3461; B66B 5/0031
See application file for complete search history.

(56) References Cited

U.S. PATENT DOCUMENTS

2011/0120814 A1 5/2011 Schuster
2020/0079619 A1* 3/2020 Thum .................. B66B 1/3423
2021/0083757 A1* 3/2021 Gustafson .......... H04B 7/15507
2023/0041490 A1* 2/2023 Vangati ................ H04L 51/214

FOREIGN PATENT DOCUMENTS

CN 107814283 A 3/2018
EP 3651419 A1 5/2020
JP 2010-150016 A 7/2010

OTHER PUBLICATIONS

First Office Action issued Apr. 11, 2025 in Chinese Application No. 202110464522.7 .
European Search Report dated Nov. 16, 2020.

* cited by examiner

*Primary Examiner* — Jianchun Qin
(74) *Attorney, Agent, or Firm* — Harness, Dickey & Pierce, P.L.C.

(57) ABSTRACT

According to an aspect, there is provided an elevator communication system. The system comprises an ethernet bus, at least one message forwarding element connected to the ethernet bus and being configured to communicate with a control entity that is external to the elevator system, and at least one elevator system component configured to communicate via the ethernet bus and being provided with an ethernet medium access control address. The at least one elevator system component is configured to at least one of receive an ethernet frame from the control entity and to send an ethernet frame to the control entity.

14 Claims, 3 Drawing Sheets

ELEVATOR COMMUNICATION SYSTEM

RELATED APPLICATIONS

This application claims priority to European Patent Application No. 20172441.6.1 filed on Apr. 30, 2020, the entire contents of which are incorporated herein by reference.

TECHNICAL FIELD

The present application relates to the field of elevator communication systems.

BACKGROUND

In modern elevator system, more and more data is sent and received by different entities of an elevator system. For example, an elevator controller may receive information from call buttons and then control an elevator drive to serve calls, or the elevator controller may receive information from a safety circuit and then based on this information control one or more entities of the elevator system. These are only some possible examples of situations where information is received and/or sent within an elevator system.

It is characteristic for the modern elevator systems that an elevator system may comprise multiple different internal data transmission solutions. This may mean that multiple different communication stacks and multiple different physical layers may be used simultaneously. The use of multiple different internal data transmission solutions may result in a complicated and inefficient solution.

Thus, it would be beneficial to have a solution that would alleviate at least one of these drawbacks.

SUMMARY

According to a first aspect, there is provided an elevator communication system comprising an Ethernet bus, at least one message forwarding element connected to the Ethernet bus and being configured to communicate with a control entity that is external to the elevator system, and at least one elevator system component configured to communicate via the Ethernet bus and being provided with an Ethernet medium access control address. The at least one elevator system component is configured to at least one of receive an Ethernet frame from the control entity and to send an Ethernet frame to the control entity.

In an implementation form of the first aspect, the control entity comprises a building manager, a building automation control entity, a cloud control entity, a remote server, or a service center.

In an implementation form of the first aspect, the elevator system component comprises a brake control unit, an emergency rescue unit, a drive unit, a door operator, a car control unit, an emergency phone, a camera, or an elevator fixture.

In an implementation form of the first aspect, the at least one elevator system component is configured to accept an Ethernet data frame only from a predetermined control entity.

In an implementation form of the first aspect, the Ethernet bus comprises a multi-drop Ethernet bus segment.

In an implementation form of the first aspect, the Ethernet bus comprises a point-to-point Ethernet bus, and the elevator system further comprises at least one connecting unit and at least one multi-drop Ethernet bus segment, wherein the at least one connecting unit comprises a first port connected to a multi-drop Ethernet bus segment of the at least one multi-drop Ethernet bus segment and a second port connected to the point-to-point Ethernet bus.

In an implementation form of the first aspect, the message forwarding element, the control entity and the elevator system component are configured to use the same protocol stack for communication.

In an implementation form of the first aspect, the Ethernet frame sent by the elevator system component comprises an address of the external control entity (134).

In an implementation form of the first aspect, the elevator system component is configured to use an encryption key to prevent non-authorized access of the elevator component.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

The following description illustrates an elevator communication system that comprises an Ethernet bus, at least one message forwarding element connected to the Ethernet bus and being configured to communicate with a control entity that is external to the elevator system, and at least one elevator system component configured to communicate via the Ethernet bus and being provided with an Ethernet medium access control address. The at least one elevator system component is configured to at least one of receive an Ethernet frame from the control entity and to send an Ethernet frame to the control entity. The illustrated solution may enable, for example, that the control entity that is external to the elevator system can directly address and control the at least one elevator system component, and the at least one elevator system component is able to directly send data to the control entity.

In an example embodiment, the various embodiments discussed below may be used in an elevator system comprising an elevator that is suitable and may be used for transferring passengers between landing floors of a building in response to service requests. In another example embodiment, the various embodiments discussed below may be used in an elevator system comprising an elevator that is suitable and may be used for automated transferring of passengers between landings in response to service requests.

Figure 1A:
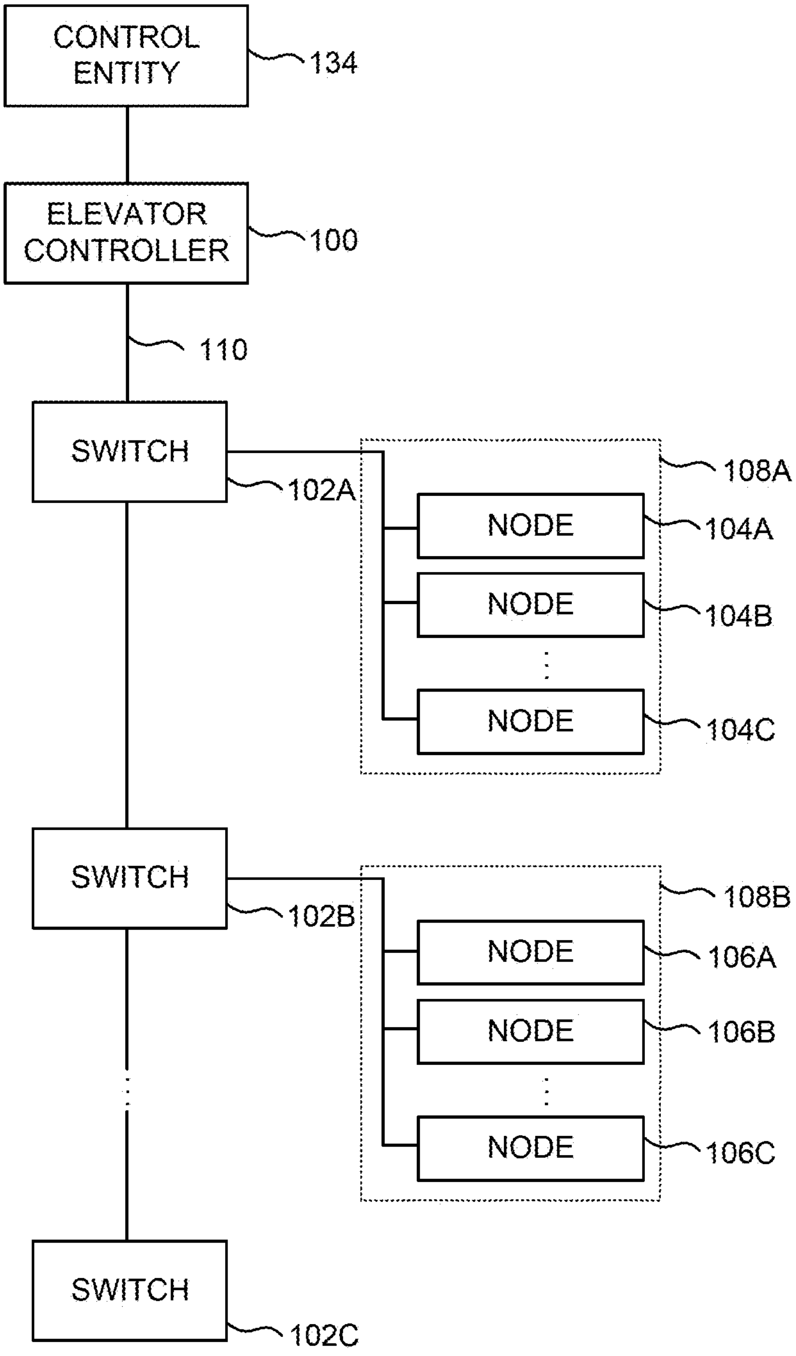
FIG. 1A illustrates an elevator communication system according to an example embodiment.

FIG. 1A illustrates an elevator communication system according to an example embodiment. The elevator communication system comprises an elevator controller 100. The elevator communication system may further comprise one or more Ethernet buses, for example, multi-drop Ethernet bus segments 108A, 108B (for example, in the form of 10BASE-T1S) reachable by the elevator controller 100, and a plurality of elevator system components, for example, elevator system nodes 104A, 104B, 104C, 106A, 106B, 106C coupled to the multi-drop Ethernet bus segments 108A, 108B and configured to communicate via the multi-drop Ethernet bus 108A, 108B. Each of the elevator system nodes 104A, 104B, 104C, 106A, 106B, 106C are provided with a node specific Ethernet medium access control address. The elevator controller 100 is reachable by the elevator system nodes 104A, 104B, 104C, 106A, 106B, 106C via the multi-drop Ethernet bus segments 108A, 108B. Elevator system nodes that are coupled to the same multi-drop Ethernet bus segment may be configured so that one elevator system node is to be active at a time while the other elevator system nodes of the same multi-drop Ethernet bus segment are in a high-impedance state.

The elevator communication system may comprise a point-to-point Ethernet bus 110 and at least one message forwarding element 102A, 102B, 102C configured to communicate with a control entity 134 that is external to the elevator system. The control entity 134 may comprise, for example, a building manager, a building automation control entity, a cloud control entity, a remote server, or a service center. The message forwarding element 102A, 102B, 120C may comprise a first port connected to the respective multi-drop Ethernet bus segment 108A, 108B and a second port connected to the point-to-point Ethernet bus 110. Thus, by using the connecting units 102A, 102B, 102C, one or more multi-drop Ethernet bus segments 108A, 108B may be connected to the point-to-point Ethernet bus 110. The connecting unit 102A, 102B, 102C may refer, for example, to a switch, a hub or a router. Further, the point-to-point Ethernet bus 110 may be connected to the elevator controller 100. The point-to-point Ethernet bus 110 may be, for example, 100BASE-TX or 10BASET1L point-to-point Ethernet bus. The multi-drop Ethernet bus segment 108A, 108B may comprise, for example, 10BASE-T1S multi-drop Ethernet bus.

The at least one elevator system node 104A-104C, 106A-106C is configured to at least one of receive an Ethernet frame from the control entity 134 and to send an Ethernet frame to the control entity 134. This means that the control entity 134 that is external to the elevator system can directly address and control the at least one elevator system node 104A-104C, 106A-106C, and the at least one elevator system node 104A-104C, 106A-106C is able to directly send data to the control entity 134.

In an example embodiment, the elevator system node 104A-104C, 106A-106C may comprise, for example, a brake control unit, an emergency rescue unit, a drive unit, a door operator, a car control unit, an emergency phone, a camera, or an elevator fixture.

In an example embodiment, the at least one elevator system component 104A-104C, 106A-106C is configured to accept an Ethernet data frame only from a predetermined control entity. This enables a solution in which predetermined control entities can directly exchange data with the elevator system components. The at least one elevator system component 104A-104C, 106A-106C may also be configured to use an encryption key to prevent non-authorized access of the elevator system component. When a corresponding key is arranged also at the control entity, secure communication may be established between the entities.

In an example embodiment, the message forwarding elements, the control entity and the elevator system components are configured to use the same protocol stack for communication. This enables a solution in which no separate gateway is needed in order to enable direct communication between the system elements.

In an example embodiment, an elevator system component may be configured to select an address of the control entity in the Ethernet frame sent by the elevator system component. The address may be selected based on the content to be sent. This enables a solution in which the elevator system component may select a desired recipient (i.e. the control entity) from a plurality of possible recipients to receive the Ethernet frame. For example, the elevator system component may send maintenance data to a cloud control entity, critical security associated data to service center, data to a building manager, a building automation control entity or a remote server.

Figure 1B:
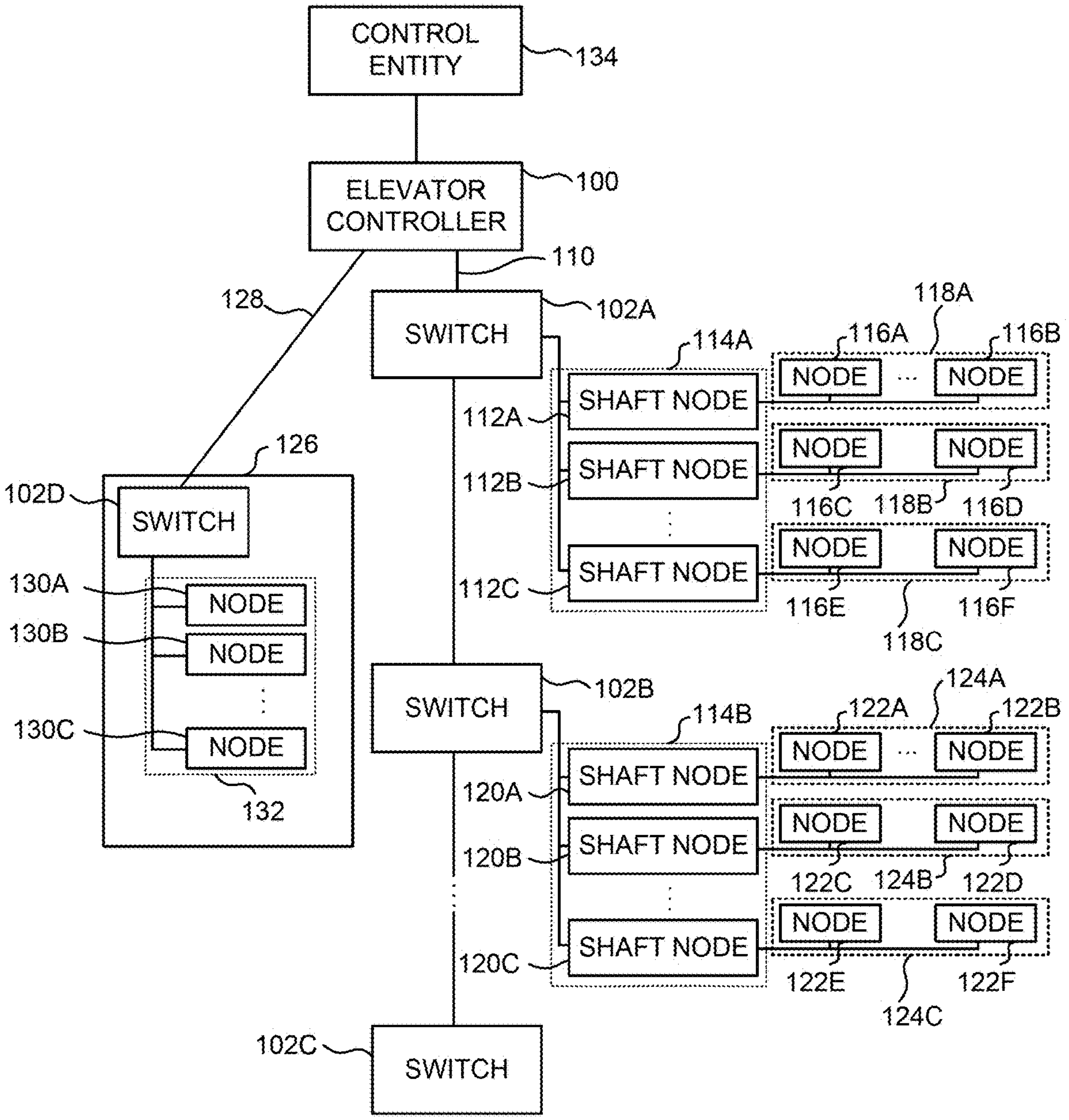
FIG. 1B illustrates an elevator communication system according to another example embodiment.

FIG. 1B illustrates an elevator communication system according to another example embodiment. The elevator communication system comprises an elevator controller 100. The elevator communication system may further comprise one or more multi-drop Ethernet bus segments 114A, 114B, 118A-118C, 124A-124C, 132 reachable by the elevator controller 100, and a plurality of elevator system components, for example, elevator system nodes 112A-112C, 116A-116F, 120A-120C, 122A-122F, 130A-130C configured to communicate via the multi-drop Ethernet bus segments 114A, 114B, 118A-118C, 124A-124C, 132 wherein the elevator controller 100 is reachable by the elevator system nodes 112A-112C, 116A-116F, 120A-120C, 122A-122F, 130A-130C via the multi-drop Ethernet bus segments 114A, 114B, 118A-118C, 124A-124C, 132.

In an example embodiment, the elevator communication system may comprise a point-to-point Ethernet bus 110 and at least one message forwarding element 102A, 102B configured to communicate with a control entity 134 that is external to the elevator system. The control entity 134 may comprise, for example, a building manager, a building automation control entity, a cloud control entity, a remote server, or a service center. The forwarding element 102A, 102B may comprise a first port connected to the multi-drop Ethernet bus segment 114A, 114B and a second port connected to the point-to-point Ethernet bus 110. Thus, by using the message forwarding elements 102A, 102B one or more multi-drop Ethernet bus segments 114A, 114B may be connected to the point-to-point Ethernet bus 110. The message forwarding element 102A, 102B may refer, for example, to a switch, a hub or a router. Further, the point-to-point Ethernet bus 110 may be connected to the elevator controller 100. The point-to-point Ethernet bus 110 may be, for example, 100BASE-TX or 10BASET1L point-to-point Ethernet bus. The multi-drop Ethernet bus segments 114A, 114B may comprise, for example, 10BASE-T1S multi-drop Ethernet bus.

The elevator communication system may further comprise a point-to-point Ethernet bus 128 that provides a connection to an elevator car 126 and to various elements associated with the elevator car 126. The elevator car 126 may comprise a message forwarding element 102D, for example, a switch, to which one or more elevator car nodes 130A-130C may be connected. In an example embodiment, the elevator car nodes 130A-130C can be connected to the message forwarding element 102D via a multi-drop Ethernet bus segment 132, thus constituting an elevator car segment.

By implementing communication within the elevator communication system using at least one point-to-point Ethernet bus and at least one multi-drop Ethernet bus segment, various segments can be formed within the elevator communication system. For example, the elevator system nodes 116A, 116B may form a first landing segment, the elevator system nodes 116C, 116D may form a second landing segment, the elevator system nodes 116E, 116F, may form a third landing segment, the shaft nodes 112A-112C may form a first shaft segment, the shaft nodes 120A-120C may form a second shaft segment, and the elevator car nodes 130A-130C may form the elevator car segment 132. Each of the segments may be implemented using separate multi-drop Ethernet buses.

The at least one elevator system node 116A-116F, 122A-122F, 130A-130B is configured to at least one of receive an Ethernet frame from the control entity 134 and to send an Ethernet frame to the control entity 134. This means that the control entity 134 that is external to the elevator system can directly address and control the at least one elevator system node 116A-116F, 122A-122F, 130A-130B, and the at least one elevator system node 116A-116F, 122A-122F, 130A-130B is able to directly send data to the control entity 134.

In an example embodiment, the elevator system node 116A-116F, 122A-122F, 130A-130B may comprise, for example, a brake control unit, an emergency rescue unit, a drive unit, a door operator, a car control unit, an emergency phone, a camera, or an elevator fixture.

In an example embodiment, the at least one elevator system component 112A-112C, 116A-116F, 122A-122F, 130A-130C is configured to accept an Ethernet data frame only from a predetermined control entity. This enables a solution in which predetermined control entities can directly exchange data with the elevator system components. The at least one elevator system component 104A-104C, 106A-106C may also be configured to use an encryption key to prevent non-authorized access of the elevator system component. When a corresponding key is arranged also at the control entity, secure communication may be established between the entities.

In an example embodiment, an elevator system component may be configured to select an address of the control entity in the Ethernet frame sent by the elevator system component. The address may be selected based on the content to be sent. This enables a solution in which the elevator system component may select a desired recipient (i.e. the control entity) from a plurality of possible recipients to receive the Ethernet frame. For example, the elevator system component may send maintenance data to a cloud control entity, critical security associated data to service center, data to a building manager, a building automation control entity or a remote server.

Figure 1C:
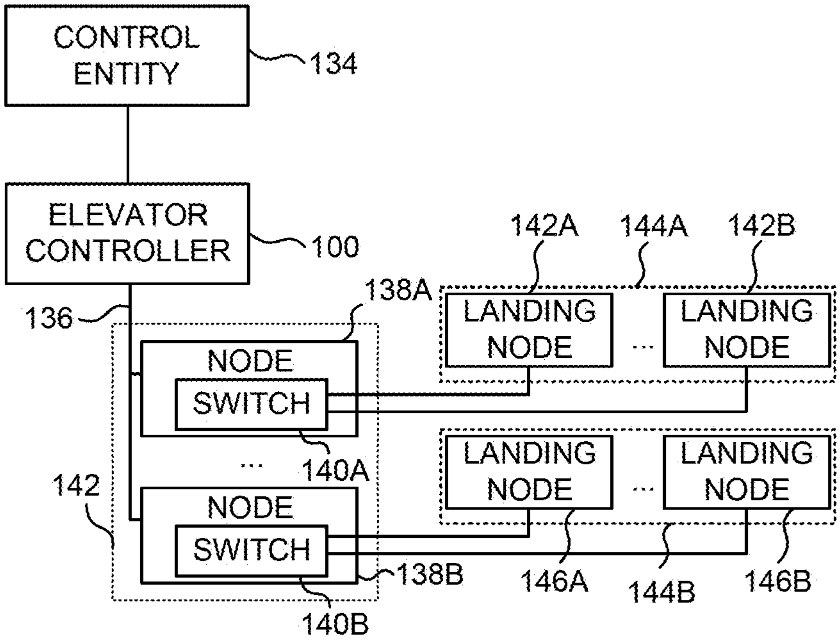
FIG. 1C illustrates an elevator communication system according to another example embodiment.

FIG. 1C illustrates an elevator communication system according to another example embodiment. The elevator communication system comprises an Ethernet bus 136 and an elevator controller 100 communicatively connected to the Ethernet bus 136 and being configured to communicate via the Ethernet bus 136. The system may further comprise a plurality of elevator system components, for example, elevator system nodes 138A, 138B communicatively connected to the Ethernet bus 136 and being configured to communicate via the Ethernet bus 136. Each elevator system node 138A, 138B is associated with a respective landing. i.e. a floor. The elevator system nodes 138A, 138B may form a multi-drop Ethernet bus segment 142 connected to the elevator controller 100.

The elevator communication system may further comprise a landing bus segment 144A, 144B at each landing, the landing bus segment 144A, 144B being connected to the elevator system node 138A, 138B associated with the landing. The landing bus segment 144A, 144B may comprise, for example, a multi-drop Ethernet bus segment. One or more elevator system component, for example, landing nodes 142A, 142B, 146A, 146B may be connected to each landing bus segment 144A, 144B. Further, each elevator system node 138A, 138B may be provided with a message forwarding element 140A, 140B, for example, a switch, a hub or a router, to enable communication between the Ethernet bus 136 and the respective landing bus segment 144A, 144B. The message forwarding element 140A, 140B is configured to communicate with a control entity 134 that is external to the elevator system. The control entity 134 may comprise, for example, a building manager, a building automation control entity, a cloud control entity, a remote server, or a service center.

The at least one elevator system node 142A, 142B, 146A, 146B is configured to at least one of receive an Ethernet frame from the control entity 134 and to send an Ethernet frame to the control entity 134. This means that the control entity 134 that is external to the elevator system can directly address and control the at least one elevator system node 142A, 142B, 146A, 146B, and the at least one elevator system node 142A, 142B, 146A, 146B is able to directly send data to the control entity 134.

In an example embodiment, the elevator system node 142A, 142B, 146A, 146B may comprise, for example, a brake control unit, an emergency rescue unit, a drive unit, a door operator, a car control unit, an emergency phone, a camera, or an elevator fixture.

In an example embodiment, the at least one elevator system component 142A, 142B, 146A, 146B is configured to accept an Ethernet data frame only from a predetermined control entity. This enables a solution in which predetermined control entities can directly exchange data with the elevator system components.

In an example embodiment, the message forwarding elements, the control entity and the elevator system components are configured to use the same protocol stack for communication. This enables a solution in which no separate gateway is needed in order to enable direct communication between the system elements. The at least one elevator system component 104A-104C, 106A-106C may also be configured to use an encryption key to prevent non-authorized access of the elevator system component. When a corresponding key is arranged also at the control entity, secure communication may be established between the entities.

In an example embodiment, the message forwarding elements, the control entity and the elevator system components are configured to use the same protocol stack for communication. This enables a solution in which no separate gateway is needed in order to enable direct communication between the system elements.

In an example embodiment, an elevator system component may be configured to select an address of the control entity in the Ethernet frame sent by the elevator system component. The address may be selected based on the content to be sent. This enables a solution in which the elevator system component may select a desired recipient (i.e. the control entity) from a plurality of possible recipients to receive the Ethernet frame. For example, the elevator system component may send maintenance data to a cloud control entity, critical security associated data to service center, data to a building manager, a building automation control entity or a remote server.

Example embodiments may be implemented in software, hardware, application logic or a combination of software, hardware and application logic. The example embodiments can store information relating to various methods described herein. This information can be stored in one or more memories, such as a hard disk, optical disk, magneto-optical disk, RAM, and the like. One or more databases can store the information used to implement the example embodiments. The databases can be organized using data structures (e.g., records, tables, arrays, fields, graphs, trees, lists, and the like) included in one or more memories or storage devices listed herein. The methods described with respect to the example embodiments can include appropriate data structures for storing data collected and/or generated by the methods of the devices and subsystems of the example embodiments in one or more databases.

All or a portion of the example embodiments can be conveniently implemented using one or more general purpose processors, microprocessors, digital signal processors, micro-controllers, and the like, programmed according to the teachings of the example embodiments, as will be appreciated by those skilled in the computer and/or software art(s). Appropriate software can be readily prepared by programmers of ordinary skill based on the teachings of the example embodiments, as will be appreciated by those skilled in the software art. In addition, the example embodiments can be implemented by the preparation of application-specific integrated circuits or by interconnecting an appropriate network of conventional component circuits, as will be appreciated by those skilled in the electrical art(s). Thus, the examples are not limited to any specific combination of hardware and/or software. Stored on any one or on a combination of computer readable media, the examples can include software for controlling the components of the example embodiments, for driving the components of the example embodiments, for enabling the components of the example embodiments to interact with a human user, and the like. Such computer readable media further can include a computer program for performing all or a portion (if processing is distributed) of the processing performed in implementing the example embodiments. Computer code devices of the examples may include any suitable interpretable or executable code mechanism, including but not limited to scripts, interpretable programs, dynamic link libraries (DLLs), Java classes and applets, complete executable programs, and the like. In the context of this document, a "computer-readable medium" may be any media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer. A computer readable medium can include any suitable medium that participates in providing instructions to a processor for execution. Such a medium can take many forms, including but not limited to, non-volatile media, volatile media, transmission media, and the like.

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. An elevator communication system configured to facilitate communication for an elevator system, the elevator communication system comprising:

an Ethernet bus;

a message forwarding element connected to the Ethernet bus, the message forwarding element configured to communicate with a controller, the controller being external to the elevator system, the controller being one of a building manager, a building automation control entity, a cloud control entity, a remote server, or a service center; and at least one elevator system component having an Ethernet medium access control address assigned thereto, the at least one elevator system component configured to exchange an Ethernet frame with the controller via the Ethernet bus using the message forwarding element such that the elevator system component is directly addressable by the controller via the Ethernet medium access control address allowing the controller to directly address and control the at least one elevator system component and the at least one elevator system component to directly send data to the controller.

2. The elevator communication system of claim 1, wherein the at least one elevator system component comprises: one or more of a brake control unit, an emergency rescue unit, a drive unit, a door operator, a car control unit, an emergency phone, a camera, or an elevator fixture.

3. The elevator communication system of claim 1, wherein the at least one elevator system component is configured to accept an Ethernet data frame only when the controller matches a set one of a plurality of controllers.

4. The elevator communication system of claim 1, wherein the Ethernet bus comprises:

a multi-drop Ethernet bus segment.

5. The elevator communication system of claim 1, wherein the Ethernet bus includes a point-to-point Ethernet bus and at least one multi-drop Ethernet bus segment, and the message forwarding element comprises:

at least one switch including a first port connected to one of the at least one multi-drop Ethernet bus segment and a second port connected to the point-to-point Ethernet bus.

6. The elevator communication system of claim 1, wherein the message forwarding element, the controller and the at least one elevator system component are configured to use a same protocol stack for communication.

7. The elevator communication system of claim 6, wherein the message forwarding element, the controller and the at least one elevator system component are configured to use the same protocol stack for communication such that the least one elevator system component is configured to communicate with the controller without utilizing a gateway.

8. The elevator communication system of claim 1, wherein the at least one elevator system component is configured to exchange the Ethernet frame with the controller by including an address of the controller therein.

9. The elevator communication system of claim 8, wherein the at least one elevator system component is configured to specify the controller among a plurality of potential recipients via the address embedded in the Ethernet frame.

10. The elevator communication system of claim 1, wherein the at least one elevator system component is configured to use an encryption key to inhibit non-authorized access.

11. The elevator communication system of claim 1, wherein, the at least one elevator system component is configured to set to a high-impedance state in response to other ones of the at least one elevator system component of a same multi-drop Ethernet bus segment being active.

12. The elevator communication system of claim 1, wherein the Ethernet bus includes a plurality of multi-drop Ethernet bus segments and a plurality of point-to-point Ethernet bus segments, the plurality of multi-drop Ethernet bus segments including a plurality of landing bus segments at respective landings of an elevator shaft, and a plurality of shaft bus segments at set positions within the elevator shaft; and the plurality of point-to-point Ethernet bus segments including a first point-to-point Ethernet bus connected between an elevator controller and a first one of a plurality of message forwarding elements associated with the elevator shaft, and a second point-to-point Ethernet bus connected between the elevator controller and a second one of the plurality of message forwarding element associated with an elevator car.

13. The elevator communication system of claim 1, wherein the at least one elevator system component includes a plurality of elevator system components, the plurality of elevator system components including at least a brake controller and a door controller each having an Ethernet medium access control address assigned thereto.

14. An elevator communication system configured to facilitate communication for an elevator system, the elevator communication system comprising:

an Ethernet bus;

a message forwarding element connected to the Ethernet bus, the message forwarding element configured to communicate with a controller, the controller being external to the elevator system; and at least one elevator system component having an Ethernet medium access control address assigned thereto, the at least one elevator system component configured to, exchange an Ethernet frame with the controller via the Ethernet bus using the message forwarding element, and set to a high-impedance state in response to other ones of the at least one elevator system component of a same multi-drop Ethernet bus segment being active.

* * * * *